US007254324B2

(12) United States Patent
Nirgudkar

(10) Patent No.: US 7,254,324 B2
(45) Date of Patent: Aug. 7, 2007

(54) SYSTEMS AND METHODS FOR FILM PROCESSING QUALITY CONTROL

(75) Inventor: Ujwal Narayan Nirgudkar, Flat A/57, Building 11, Piramal Nagar, S.V. Road, Goregaon (West), Mumbai (IN) 400-062

(73) Assignee: Ujwal Narayan Nirgudkar, Mumbai, Maharashtra (IN)

( * ) Notice: Subject to any disclaimer, the term of this patent is extended or adjusted under 35 U.S.C. 154(b) by 197 days.

(21) Appl. No.: 11/017,515

(22) Filed: Dec. 20, 2004

(65) Prior Publication Data

US 2005/0100335 A1 May 12, 2005

Related U.S. Application Data

(63) Continuation-in-part of application No. 10/639,801, filed on Aug. 11, 2003, now Pat. No. 6,849,366.

(51) Int. Cl.
*G03B 17/24* (2006.01)

(52) U.S. Cl. ..................................................... 396/311

(58) Field of Classification Search ................ 396/311, 396/563, 569; 356/443, 444
See application file for complete search history.

(56) References Cited

U.S. PATENT DOCUMENTS

| | | | | |
|---|---|---|---|---|
| 4,335,956 | A * | 6/1982 | Findeis et al. | 355/27 |
| 5,617,213 | A * | 4/1997 | Shih | 356/443 |
| 5,667,944 | A * | 9/1997 | Reem et al. | 430/359 |
| 6,683,981 | B1 * | 1/2004 | Matama | 382/167 |
| 2003/0170017 | A1 * | 9/2003 | Prigent et al. | 396/311 |

* cited by examiner

*Primary Examiner*—W. B. Perkey
(74) *Attorney, Agent, or Firm*—Robert Popa

(57) ABSTRACT

A photographic film with a row of sprocket holes formed along each edge thereof includes one or more sensitometric step wedges of different light intensity values exposed adjacent one of the rows of sprocket holes on the photosensitive emulsion surface of the film. The light intensity values from one or more of the weges are sensed, and a film process may be adjusted in accordance with the sensed values.

5 Claims, 10 Drawing Sheets

| | | | |
|---|---|---|---|
| Opacity | $\frac{\text{Incident light}}{\text{Transmitted light}} = \frac{I}{T} = \frac{100}{10} = 10$ | | |
| Density | $= \log_{10}$ of opacity (I.e. $\log_{10}$ of 10) | = 1 | (i.e. the log of the reciprocal of transmission ratio) |

These values produce an 11 step,
Step Wedge where each exposure is doubled.

| | | | | | | | | | | | |
|---|---|---|---|---|---|---|---|---|---|---|---|
| 0 | 0.30 | 0.60 | 0.90 | 1.20 | 1.50 | 1.80 | 2.10 | 2.40 | 2.70 | 3.00 | log It → |
| 0.15 | 0.45 | 0.75 | 1.05 | 1.35 | 1.65 | 1.95 | 2.25 | 2.55 | 2.85 | | |

The lower values multiply the upper values by Square root of 2 i.e. 1.414.
If included ,they will produce a 21 step ,Step Wedge

| | log It values |
|---|---|
| 1 | 0.00 |
| 2 | 0.15 |
| 3 | 0.30 |
| 4 | 0.45 |
| 5 | 0.60 |
| 6 | 0.75 |
| 7 | 0.90 |
| 8 | 1.05 |
| 9 | 1.20 |
| 10 | 1.35 |
| 11 | 1.50 |
| 12 | 1.65 |
| 13 | 1.80 |
| 14 | 1.95 |
| 15 | 2.10 |
| 16 | 2.25 |
| 17 | 2.40 |
| 18 | 2.55 |
| 19 | 2.70 |
| 20 | 2.85 |
| 21 | 3.00 |

FIG. 9

| Film Speed IN Ft per Min | Fequency |
|---|---|
| 100 | 10 |
| 200 | 9 |
| 300 | 8 |
| 400 | 7 |
| 500 | 6 |
| 600 | 5 |
| 700 | 4 |
| 800 | 3 |
| 900 | 2 |
| 1000 | 1 |

SYSTEMS AND METHODS FOR FILM PROCESSING QUALITY CONTROL

RELATED APPLICATIONS

This disclosure is a continuation-in-part of and claims priority to U.S. Ser. No. 10/639,801, filed on Aug. 11, 2003 now U.S. Pat. No. 6,849,366, the entire contents of which are incorporated herein by reference thereto.

TECHNICAL FIELD

This disclosure relates to the field of film processing quality control, and more particularly to methods and devices for repeatedly and automatically assessing processing variables while processing a roll of film. The embodiments disclosed herein provide a novel method for quality control of the processing of motion picture and other photographic films wherein quality may be monitored and controlled by an automatic process, not as chosen by human operators. The methods disclosed may also be implemented repeatedly and/or continuously, and not only at intervals as may be chosen by human operators.

BACKGROUND

In order to monitor and control a process, it is useful to identify parameters that accurately and repeatedly measure the status of the process. In the case of processing photographic film, it is well known to describe the photographic response of each particular film to that process by a curve. This curve is typically referred to as the "characteristic curve" for the film and it represents the relationship between developed density of the photosensitive emulsion on the film and the logarithm of exposure of the emulsion to light. This curve is often referred to as the H & D curve, named after Hurter and Driffield, The Journal of the Society of Chemical Industry, No. 5, Vol. IX, May 31, 1890.

The "characteristic curve" is determined using a control strip as is well known in the art. The control strip is produced by taking a small piece of film and exposing it in a sensitometer by contact with an original step wedge, which has, typically, 21 densities in steps of 0.15 log exposure units (for X-ray films, for example), with light of a color appropriate to the type of film being used for process control (typically either blue or green for X-ray films). The exposed strip is processed in the processor whose performance is being monitored, and is then ready to be measured.

The great majority of motion picture film processing laboratories use sensitometry extensively to monitor and evaluate the quality and consistency of various variables affecting their film processing. Sensitometric quality control procedures used by these laboratories typically entail processing pre-exposed film control strips and then measuring the red, green and blue densities of these processed control strips. The measured densities are then compared with the densities evinced by reference control strips provided by the film manufacturer. Various process control variables may then be adjusted, if necessary, to improve and/or correct the processing of the film, according to principles well known in the art.

Sensitometry requires that the photographic emulsion on the test strips be exposed to a specified light source for a specified time and then the film processed in closely controlled conditions. The resultant densities produced on the test film are then measured and plotted against a typically logarithmic exposure scale. The most common method for determining the effect of exposure and processing on a sensitometric strip is to measure its light stopping ability. As illustrated in FIG. 1, when incident light 10 strikes a photographic film 20, a portion 30 of the incident light is reflected backwards, the grains of the silver halide emulsion 40 on the film 20 absorb another portion 50, and most of the remainder 60 of the light is scattered as a result of bouncing off the grains of the emulsion. The light stopping ability of a film is a combination of these three effects, and is typically denoted in terms of its transmittance.

Transmittance is defined as the ratio of transmitted light to the incident light:

$$\text{Transmittance} = \frac{\text{Transmitted Light}}{\text{Incident Light}}$$

With reference now to FIG. 2, in an example where 100 units of light 10 are incident on a film 20 and 50 units of light are transmitted therethrough, the transmittance of the film is equal to 50/100=0.5. The numerical value of the transmittance becomes smaller as the light stopping ability increases, making numerical precision somewhat cumbersome. Thus, it is sometimes preferable to refer to the opacity O of a film, which is defined as the ratio of incident light to the transmitted light:

$$O = \frac{\text{Incident Light}}{\text{Transmitted Light}} = \frac{I}{T}$$

The opacity of a film increases in geometric proportion with the film thickness and hence another term called density is commonly used to express the photographic effect of a film. The concept of density is illustrated in FIG. 3, and is defined as $$\text{Density} = \log(O) = \log\frac{I}{T}$$

The concept of density provides a numerical description of the image that is a more useful measure of the light stopping ability of a film. Additionally, the human eye has a nearly logarithmic response to an image and hence density values more appropriately represent the description of such an image.

To correctly measure density it is necessary to measure the units of transmitted light 10. The transmitted light rays 10 are grouped in a certain distribution as a result of bouncing off the emulsion grains 40. This distribution of transmitted light will be wider for coarse-grained images than for fine-grained images because the larger grain size provides a greater surface area over which bouncing can occur. As a result, coarse-grained images scatter more light than fine-grained image.

With reference to FIG. 4, when a photoreceptor 70 is placed far from a film sample 20, only light transmitted over a very narrow angle will be recorded in what is commonly called specular measurement. Alternatively, when the photoreceptor is placed in contact with the film sample, all of the transmitted light will be collected because the angle of collection is much larger. This is commonly referred to as diffuse measurement.

The relationship between the diffuse density and the specular density for a given sample is called the Callier co-efficient, or Q factor, and is defined as $$Q = \frac{\text{Specular Density}}{\text{Diffuse Density}}$$

The actual conditions of density measurements vary with the purpose for which these values are to be used. If the purpose is to predict the printing characteristics of the negative, then the spectral response characteristic of the print film should be simulated. To determine the visual appearance of the image, the spectral response of the human eye should be simulated. In the first case the result is called the printing density and in the second case the result is called the visual density. If the conditions of measurement do not simulate the photographic system being used, the resulting data will lack the validity even though sophisticated, well calibrated instruments are used.

To evaluate and understand the results of the sensitometric tests discussed above, it is necessary to plot the densities occurring on the test strip in relation to exposures to which the film was subjected to produce each such density. The characteristic curve obtained is called, variously, either a D log(E) curve, an H and D curve, or a log(It) curve. In this curve density is represented on the vertical (Y) axis of the graph and the logarithmic values of the exposure or the log It (Intensity×Time) are represented on the horizontal (X) axis of the graph.

To obtain a characteristic curve for a particular film, a sample of that film is exposed to a light source in a sensitometer by using either a Time scale or an Intensity scale. In the Time scale approach the length of time of exposure is varied, whereas in the Intensity scale method the current is changed so as to vary the light intensity of the sensitometer. A film exposed in a sensitometer produces what is commonly referred to as a step wedge (see FIG. 6).

There are three common types of photographic step wedges that are commonly used: the three patch wedge, the 11 step wedge, and the 21 step wedge (also referred to as a $\sqrt{2}$ wedge). Each of these wedges have particular benefits, but the 21-step wedge shown in FIGS. 5 and 6 gives the best results as it gives a smoother, more accurate curve. The reason it is also referred to as a $\sqrt{2}$ wedge is that the difference between each exposure or step in the wedge is equal to the previous exposure multiplied by $\sqrt{2}$ or 1.414. This fits on to the log(It) scale very well because the log value of $\sqrt{2}$ is 0.15, as illustrated in FIG. 5.

Referring to FIG. 7, the characteristic curve thus plotted can be conveniently divided into four major sections: base plus fog, toe, straight line, and shoulder. The base plus fog region represents the combination of the density of the emulsion support (base) and the density arising from the development of some unexposed silver halide crystal (fog). Here the curve is horizontal and the film is not capable of recording subject details or tonal differences. The toe region is characterized by low density and constantly increasing slope as exposure increases. It is in this area that shadow details in the subject are normally placed.

With reference to FIG. 8, the straight line region is the middle density region where the slope (also called gamma) is nearly constant and is steepest. It is in this region that subject tones are reproduced with greatest separation, and this is therefore the most useful section of the film. The shoulder is the portion where the density is high but the slope is decreasing with increase in exposure. Most of this section is usually avoided when exposing film.

Sensitometry is in wide use and has been the subject of a number of attempts to improve upon it. In U.S. Pat. No. 4,508,686 an apparatus and test strip for evaluation of a film processor are disclosed. The apparatus evaluates the optical density of graded density test areas on a developed (processed) film by comparing a photodetector signal with a preselected voltage relating to an acceptable/too dark threshold of an unexposed or base fog area, a maximum density or dark area, and a medium density area. This method thus also relies on separate test strips to evaluate the performance of a film processor at timed intervals.

Another approach is described in U.S. Pat. No. 4,985,320 and entails using a voltage set point system to provide a constant illumination of a photographic test strip and a voltage divider comparator network for accurately determining exposed film density levels. The method thus provides an indication of the state of the film developer solution that is substantially independent of the temperature of the photodetector or large changes in the intensity of the test light source. Similarly, U.S. Pat. No. 4,004,923 describes a method for controlling developer activity by exposing a test film having various transparent areas and opaque areas, and insets and background areas that can blend into one another when the developer fluid is fresh. These methods therefore also rely on the use of a test strip exposed at predetermined time intervals.

U.S. Pat. No. 5,481,480 proposes a novel formula to describe the characteristic curve of a material as assessed with a step wedge as described above. The characteristic curve expression takes into account the density at saturation as well as certain constant parameters for the particular material. Therefore, this method also does not obviate the need for a separate film test strip for obtaining a step wedge.

Sensitometry procedures as currently known and utilized in motion picture film processing laboratories involve measurement of pre-exposed control film strips at fixed time intervals. However, film processing machine speeds have increased significantly in recent years, thereby resulting in a lesser frequency of sampling due to the fixed time intervals at which sampling is conducted. As illustrated in FIGS. 9 and 10, at a frequency of one sample per hour, the frequency of sampling per length of film drops significantly with the amount of film processed per hour. What is therefore now needed are improved methods and apparatuses for assessing process quality control variables suitable for use with modern, high speed film processing machines. The embodiments disclosed herein address this and other needs.

SUMMARY

In one embodiment disclosed herein, a photographic film comprises a length of film with a row of sprocket holes formed on each side thereof, a photosensitive emulsion disposed on a surface of the film, and a sensitometric step wedge of different light intensity values exposed along one side of the photosensitive emulsion surface of the film.

In another embodiment disclosed herein, a photographic film comprises a length of film with a row of sprocket holes formed on each side thereof, and a photosensitive emulsion disposed on a surface of the film and having a plurality of areas exposed to different light intensity values disposed along one side of the film to form a sensitometric step wedge thereon.

In a further embodiment disclosed herein, a method of manufacturing a photographic film comprises selecting a length of film with a row of sprocket holes formed on each side thereof, disposing a quantity of photosensitive emulsion on one side of the film, and exposing a plurality of areas to different light intensity values along one side of the photosensitive emulsion surface of the film to form a sensitometric step wedge thereon.

These and other features and advantages as disclosed herein will become apparent in view of the following detailed description and appended drawings, wherein like numerals refer to like elements and features.

BRIEF DESCRIPTION OF THE DRAWINGS

FIG. 9 is a table illustrating frequency of sampling for a film processing machine;

DETAILED DESCRIPTION

Figure 1:
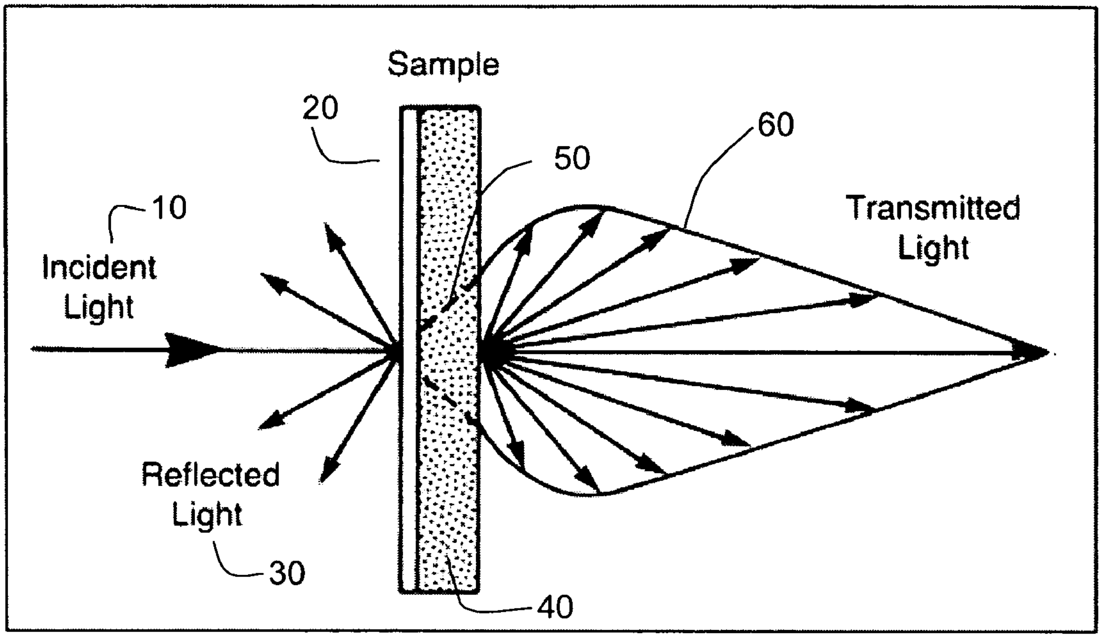
FIG. 1 is a schematic diagram showing light reflected, absorbed and transmitted by a photographic film.
Figure 2:
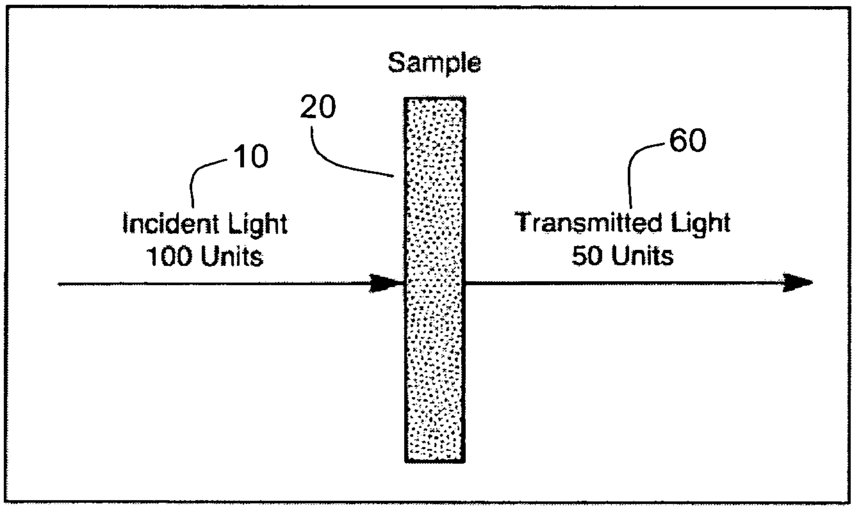
FIG. 2 is a schematic diagram showing a sample of film evincing a transmittance of 0.5.
Figure 3:
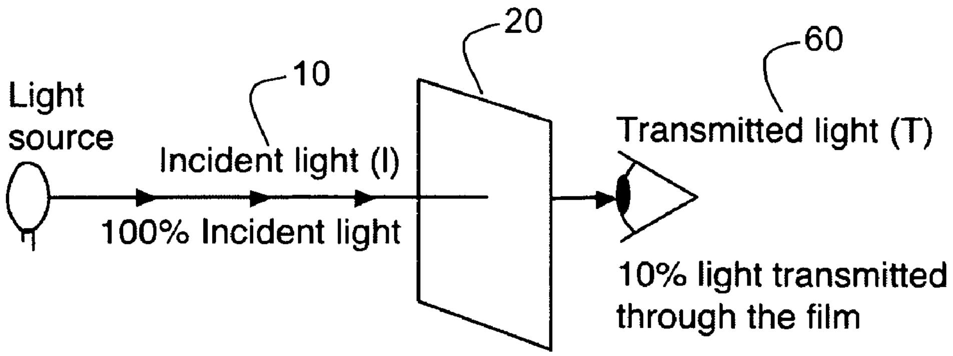
FIG. 3 is a schematic diagram explaining the concepts of density and opacity.
Figures 4, 5:
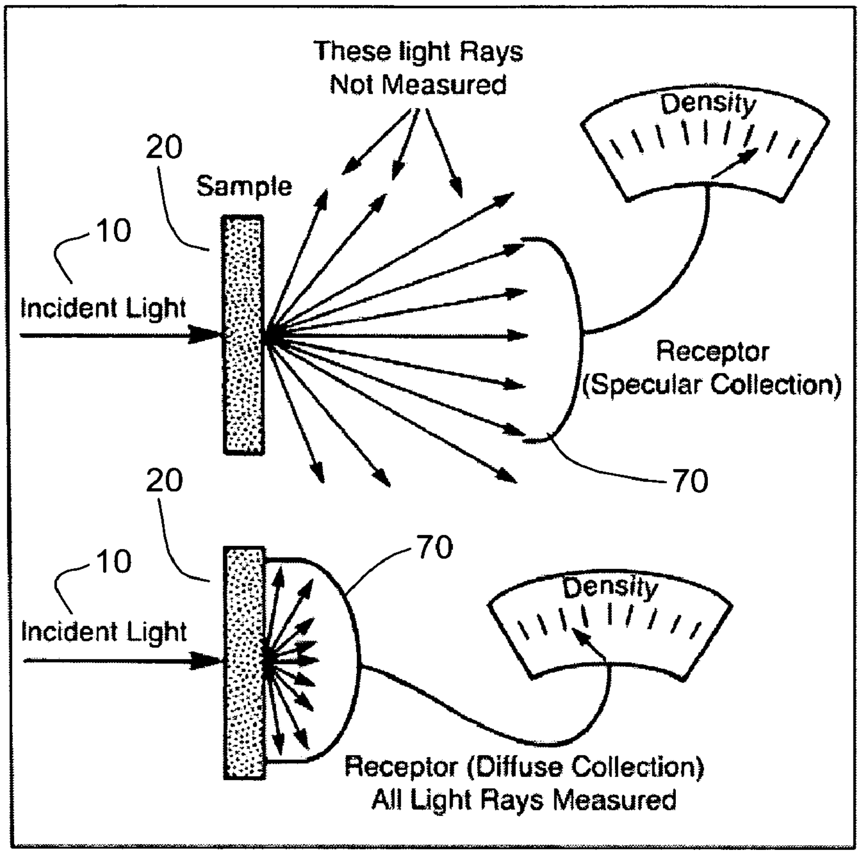
FIG. 4 is a schematic diagram showing specular collection and diffuse collection.
FIG. 5 is a schematic diagram illustrating the exposures required to form a 21 step sensitometric wedge.
Figure 6:
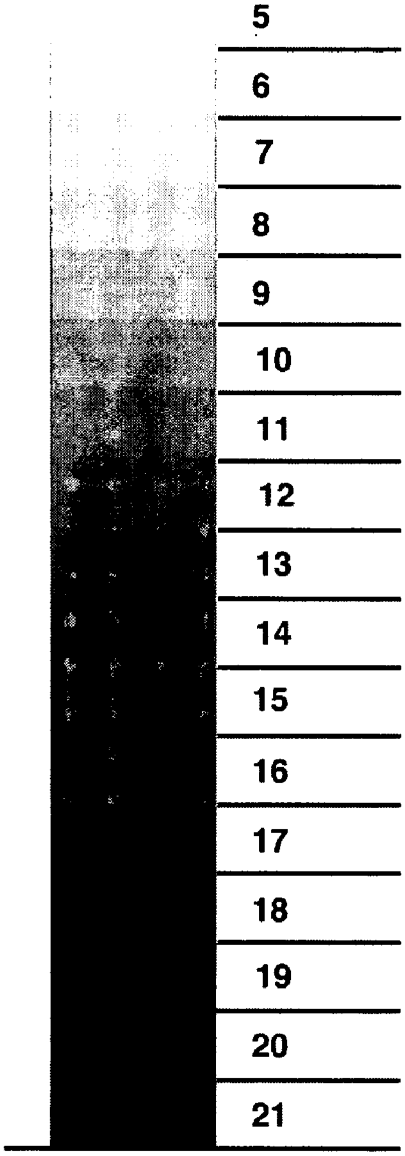
FIG. 6 shows a 21 step sensitometric wedge on a film sample.
Figure 7:
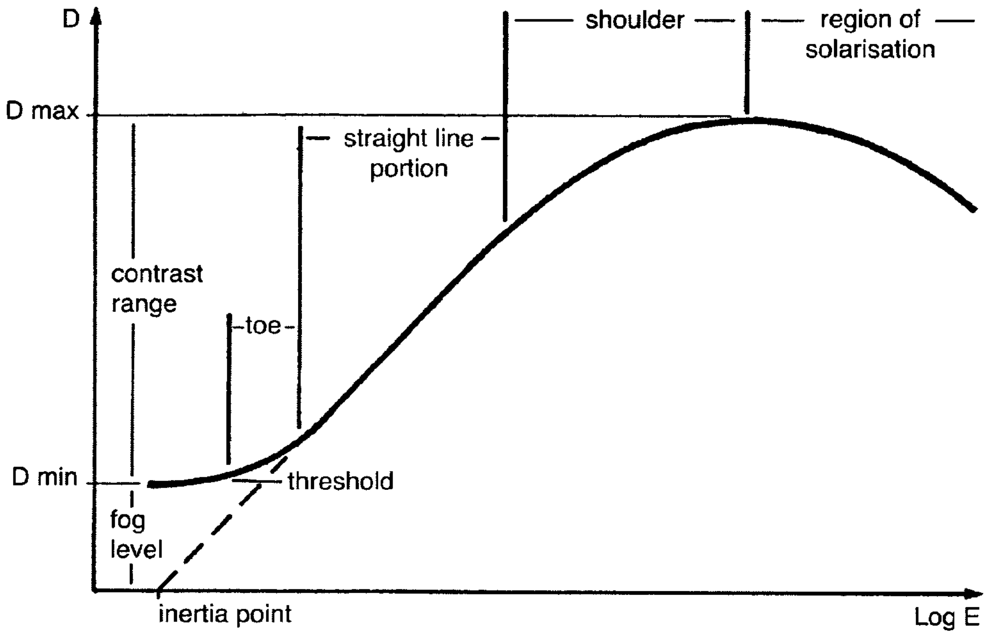
FIG. 7 is a typical characteristic curve for a black and white photographic film.
Figure 8:
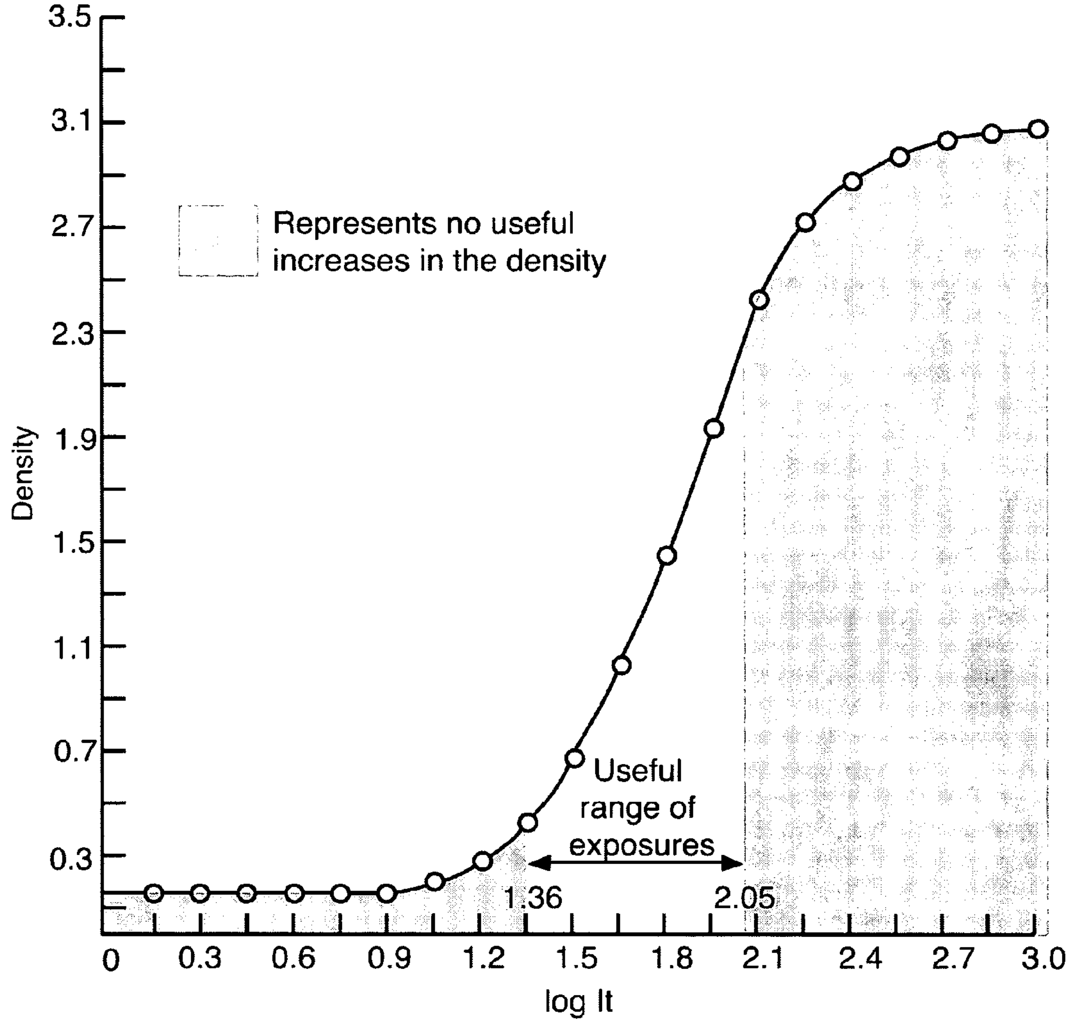
FIG. 8 is a typical characteristic curve for a black and white photographic film illustrating a useful range of exposures.
Figure 10:
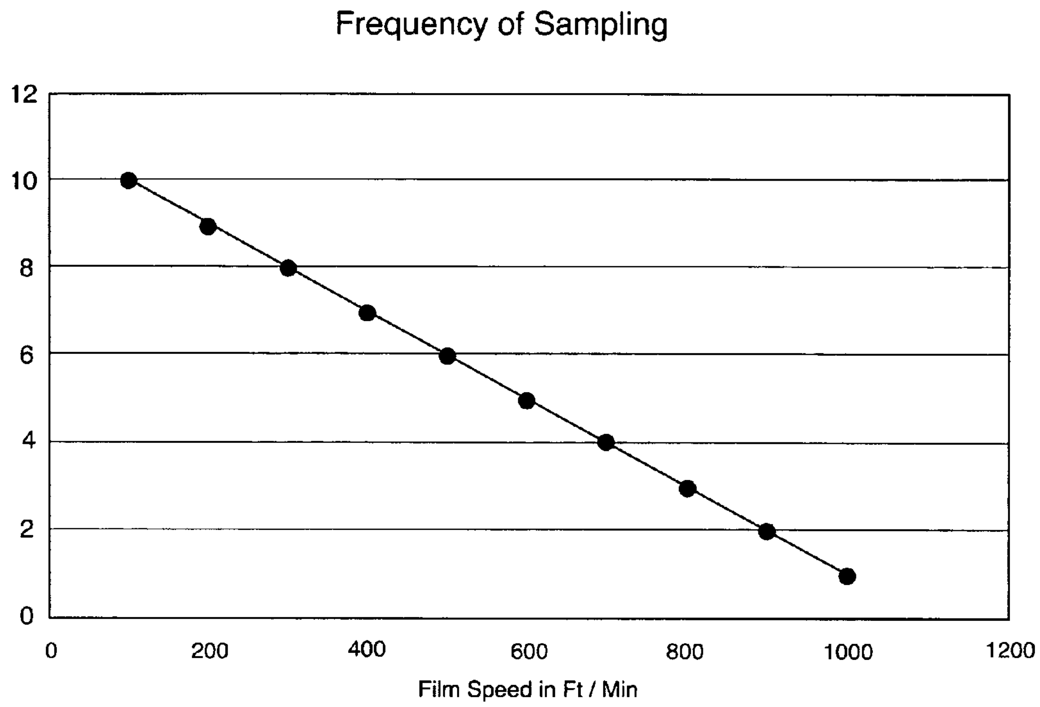
FIG. 10 is a chart illustrating frequency of sampling for a film processing machine.
Figure 11:
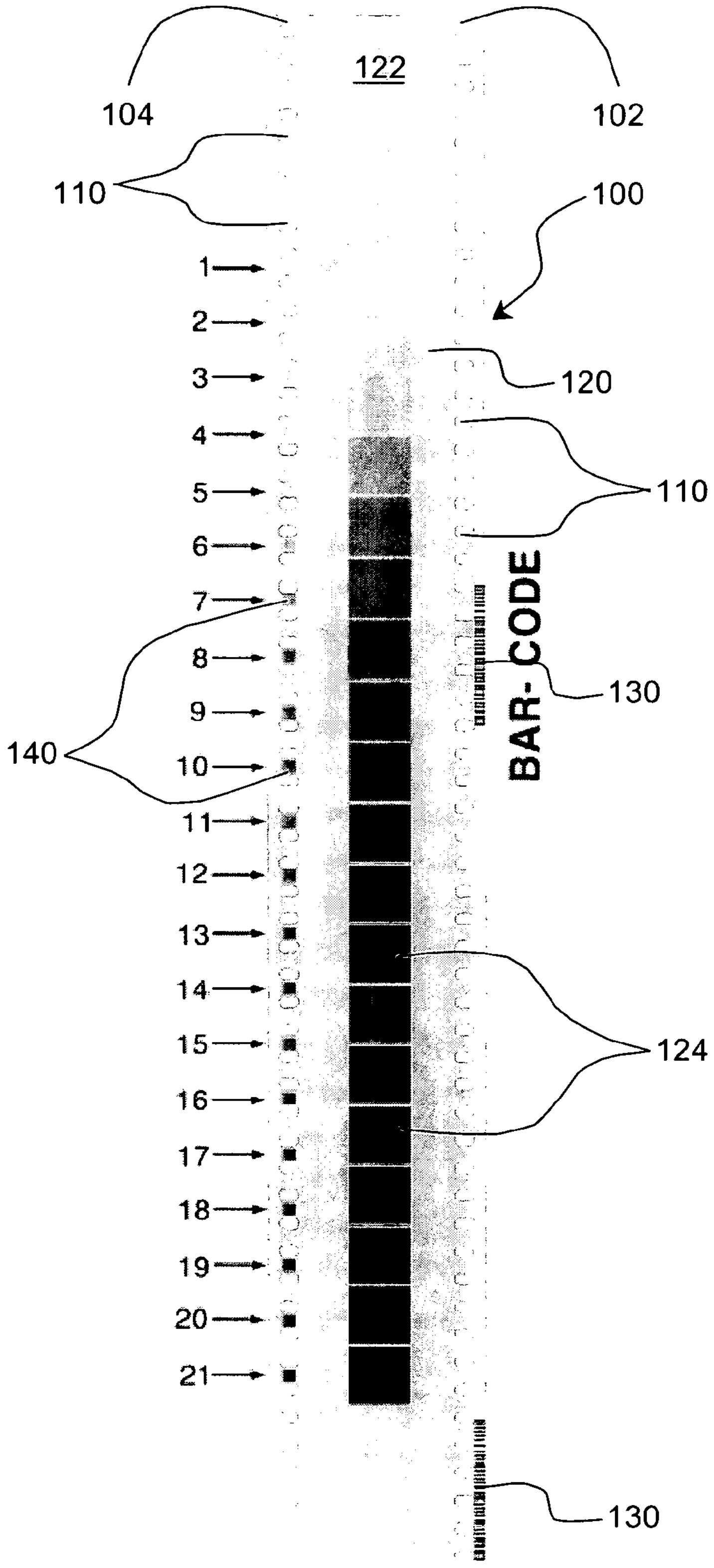
FIG. 11 depicts a length of photographic film with a sensitometric wedge exposed along one side in accordance with an embodiment as described herein.

With reference to FIG. 11, and in accordance with the novel principles disclosed herein, a length of photographic film 100 is formed with sprocket holes 110 along both sides 102, 104 thereof, as is well known in the art. A photographic emulsion 120 is disposed along one surface 122 of the film to be exposed to light and thus form still photographic images 124 along the surface 122 of the film 100. Also as commonly known in the art, a barcode 130 may be optionally imprinted along one side 102 of the film 100.

In accordance with one embodiment, and with continued reference to FIG. 11, film 100 is further formed with 21 exposed areas 140. Each exposed area 140 is located between two adjacent sprocket holes 110 along one side 102 or 104 of film 100. The embodiment of FIG. 11 shows two sprocket holes 110 between each pair of adjacent exposed areas 140. This is for illustration purposes only, and there may be any number of sprocket holes 110 between any two adjacent exposed areas 140. Furthermore, the adjacent areas 140 may also be located at any other practicable positions on the surface 122 of the film 100, and are not limited solely to positions between sprocket holes 110. It may further be found to be preferable, although not necessary, to locate the exposed areas 140 along the side 104 of the film that is opposite from the side 102 of the film along which the barcode 130 is imprinted.

The exposed areas 140 are exposed to varying time and/or light intensity values to form a 21 step, or $\sqrt{2}$, wedge as discussed previously. In other embodiments, a number of areas 140 other than 21 may be exposed along one side 102 or 104 of the film 100, as discussed previously. Thus, three, or 11, or any other number of exposed areas 140 may be formed along one side 102 or 104 of film 100 in accordance with embodiments disclosed herein.

Also in accordance with the embodiments disclosed herein, it may further be preferable to form a plurality of wedges along one side of the film 100, wherein each wedge includes 21 (or other number) areas of different exposures. In this manner, the wedge of exposed areas 140 may be repeated at selected intervals along the length of film 100.

In a method of use as disclosed herein, a film 100 is formed as previously described with rows of sprocket holes 110 along each side 102, 104 and has a quantity of photosensitive emulsion 120 disposed over one surface 122. One or more wedges are next formed along one side 102 or 104 of the film 100 by exposing a preselected number of areas (e.g. 21) of the emulsion surface 122 to varying levels of light intensity to form each wedge. The exposed areas may be located between the sprocket holes 110 formed along the respective side 102, 104 of the film 100, as previously described. It may be found preferable to form the exposed areas 140 forming each wedge within the film manufacturing process, as a step following, e.g., the disposal of photosensitive emulsion 120 over the surface 122 of the film 100. In this manner, the manufacturer of the film may form each wedge by exposing each area 140 to strictly defined and tightly controlled light intensity levels and thereby provide an extremely accurate sensitometric wedge by which a film processing lab may gauge its film processing variables.

Following use of the film 100, i.e. exposure within a camera such as a motion picture camera so as to capture motion as multiple individual exposures or still photographic images 124, the film may be processed in a laboratory in accordance with principles and techniques known in the art. As the film is processed, the images 124 as well as the exposed areas 140 will be developed together by exposure to the same chemicals and other process variables, and the exposed areas 140 will thus form one or more sensitometric wedges along the respective side 102, 104 of the film. The processing laboratory may now use the wedge or wedges to assess the state of its process variables by comparing the wedge or wedges against reference values provided by the film manufacturer, as is well known in the art.

Thus, in accordance with embodiments described herein, a film may be formed with multiple sets of exposed areas 140 to provide multiple sensitometric wedges along its length. A film processing laboratory may then use a densitometer to continuously compare these wedges against reference values provided by the manufacturer, and thus continuously check and if necessary adjust certain of its film processing variables. The ability to perform such continuous, "on the fly" measurement and correction of a film developing process may greatly enhance the quality of processing and drive down costs by greatly increasing the frequency at quality control measurements are performed and corrective measures taken. In one embodiment, one or more densitometers may be associated with a film processing machine so as to provide feedback to the machine to automatically adjust its process parameters in accordance with the differences between the newly-developed wedges on a film and reference values provided by the film manufacturer.

Thus, in accordance with embodiments described herein, the process of taking sensitometric readings may be fully automated, thereby making obsolete the manual, time-consuming, wasteful method used today of exposing a separate, sacrificial strip of film in a sensitometer, then processing the strip, and then comparing the developed strip with a reference strip in a densitometer. The cost savings and processing quality will further be enhanced by the removal of the human element, which is always prone to costly errors.

Figure 12:
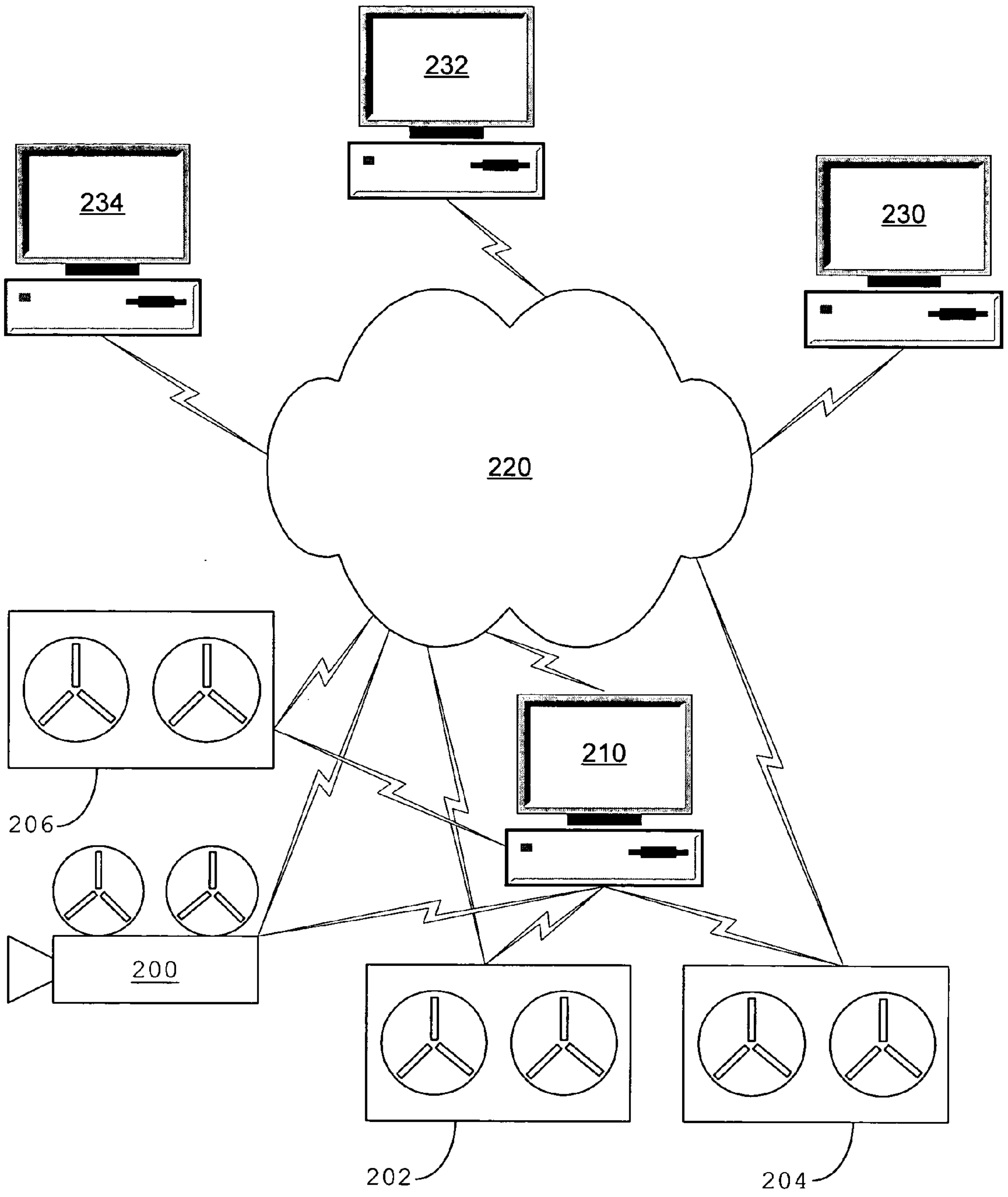
FIG. 12 is a schematic diagram of a network of devices utilizing photographic film with sensitometric wedges in accordance with embodiments as described herein

Data generated from the continuous or repetitive comparing of wedges on the film with the manufacturer reference values may be gathered for various purposes. In embodiments described herein with reference to FIG. 12, various devices including, but not limited to, film projectors 200 as may be employed in movie theatres, telecine systems 202, densitometers 204 as may be employed in film processing laboratories or in telecine laboratories or in any other post-production endeavor such as transfer to tape, and film scanners 206, may be equipped with hardware and/or software to allow reading sensitometric wedges provided on a length of film 100 as described elsewhere herein and optionally comparing the sensed values on-the-fly with reference values from the film manufacturer. Such devices may optionally be connected to a computer 210 or similar device. Each device 200, 202, 204, 206 as well as the computer 210 may further be connected to a network 220 such as a local area network, a wide area network, or the Internet. Other computers 230, 232 may further be connected to the network 220 to exchange data with the devices 200, 202, 204, 206 and the computer 210.

In one embodiment, film manufacturers may provide a computer 230 that is accessible via the network and that contains reference wedge reading values for their respective film stocks. A processing lab would thus be able to connect to a particular manufacturer's computer to download the reference values for wedge readings for any particular film type that may be processed at a particular time and use those values to compare against the actual readings obtained by the laboratory densitometer 204. Such data may be made available to any other type of device able to connect to the manufacturer's computer 230. The differences between the sensed values and the reference values may also be uploaded from the laboratory densitometer to a central computer 232 that tracks the performance, or performs quality control, of multiple laboratories. This approach may allow large film processing companies to instantaneously, continuously track the performance of their laboratories located throughout the world and ensure that they all maintain the required standard of performance, and to be alerted when a laboratory is underperforming before a large quantity of film has been processed poorly. Additionally, any deterioration that may have occurred during transport, such as from thermal or x-ray exposure, will also be identified, measured, and appropriately compensated for.

The data generated may also be used in telecine or scanner devices to, e.g., adjust the exposure of the film and/or other variables to compensate for any deviation from the reference standard as indicated by the sensed wedge values. Such adjustments may be performed each time a new wedge is sensed, and thus this procedure may be limited solely by the frequency of wedges along the length of the film. This procedure would help ensure that the final product, whether a telecine transfer or a digitized version, is faithful to the original film and thereby minimize costly, laborious adjustments that are typically performed manually by highly skilled technicians to ensure that color balance and other variables are correct and true to the original.

The data obtained from the wedges may further be used in a movie theatre where the film projectors 200 are equipped to sense the wedges contemporaneously with projecting the movie photographed onto the length of film 100. In this manner, the physical state of the film may be tracked and projection variables such as projection light intensity and color balance may be adjusted to compensate for the inevitable deterioration of the film arising out of repeated exposure in the projector. Again, the data sensed from the wedges on the film every time the film is projected may be upload via the network 220 to a central computer 234 that may belong to the headquarters of the movie theatre corporation, or any other entity tasked with tracking the quality of the film. Such entity may then track the deterioration of film reel being shown in movie theaters worldwide and, whenever the data sensed from a particular reel indicates that it has reached a certain degree of deterioration, a replacement reel may be sent to that movie theatre before the catastrophic failure of that reel may force the theatre to cancel movie showings to the inability to project the film.

As known in the art, software is available for capturing densitometer data and using this data for various purposes, including post-production, mastering, and digital transfers. Devices such as telecine systems 202, densitometers 204, and scanners 206 may be equipped with such software, or may be connected to computers 210 equipped with such software. Such software is typically used in film processing laboratories to aid in the reading of conventional sensitometric wedges with conventional densitometers and the sorting and processing of such data to determine how to adjust the processing parameters as necessary. Such software may be modified to acquire data generated by reading wedges provided on film as described herein, process or analyze this data such as by comparing with manufacturer reference data that may be automatically downloaded from the manufacturer for each new film batch, and automatically and continuously adjust the film processing parameters in accordance with the processed data. The tremendous benefits conferred by such a method in terms of quality and costs are easily appreciable by the skilled person.

By permanently associating sensitometric wedges with the film they represent, other advantages may be realized. The wedges may be compared to manufacturer reference values on a periodic basis to assess the effect of aging upon the quality of the processed film. In this manner, the deterioration of film and of images on the film may be closely monitored. Furthermore, the density values of the wedges may be associated with the barcode on the film to provide a facile, automatic method of data gathering for various tracking and analysis purposes, such as storage and transportation conditions and effects, for every single batch, film type, emulsion type, etc.

Additionally, using different films (e.g. different manufacturers and/or processing labs and/or age of film stock, exposure conditions, etc.) together (e.g. splicing/intercuttability) will be greatly facilitated by having accurate, high sampling rate information of the state of each length of film. Furthermore, monitoring of the processing quality of various processing laboratories will be greatly facilitated and enhanced. In addition, damaging effects of x-rays on various film stock (particularly damage to film by exposure to x-rays in airports, now a common occurrence) may also be accurately and economically assessed. Providing sensitometric wedges as taught herein will provide useful references while carrying out color corrections for motion picture film to telecine transfer, for making digital intermediates from color negative films, as well as for making digital prints that may be shown in digital projection theatres.

The embodiments and principles disclosed herein are in no way limited by the type of film, and are equally applicable to all types and formats of film including, but not limited to, 8 mm, 16 mm, Super 16 mm, 35 mm, Super 35 mm, 65 mm, 70 mm, Large format (e.g. Imax Films) and all types of color and black & white film including Picture Negative, Picture Positive, Master Positive, Intermediate & Duplicate Negative Film, Soundtrack Negative & Positive Films, and further including all still photographic Negative Positive & Reversal Films, Photographic Color, Black & White, and x-ray films of all formats.

Having now described the invention in accordance with the requirements of the patent statutes, those skilled in this art will understand how to make changes and modifications to the present invention to meet their specific requirements or conditions. Such changes and modifications may be made without departing from the scope and spirit of the invention as disclosed herein.

What is claimed is:

1. A method, comprising:

selecting a photographic film comprising a length of film with a row of sprocket holes formed along each edge thereof, a photosensitive emulsion disposed on a surface of the film to provide a light exposure area between the two rows of sprocket holes for forming photographic images, and one or more sensitometric step wedges of different light intensity values exposed adjacent one of the rows of sprocket holes and separate from the light exposure area on the photosensitive emulsion surface of the film; and sensing light density values of at least one of the one or more step wedges.

2. The method of claim 1, further comprising:

comparing the sensed density values with reference values to generate data indicative of differences therebetween.

3. The method of claim 2, further comprising:

sending the data to a remote recipient.

4. The method of claim 2, further comprising:

subjecting the film to a process; and adjusting one or more parameters of the process in accordance with the data.

5. The method of claim 4, wherein the process is selected from among the group of processes comprising chemical processes, telecine processes, scanning processes, and digitizing processes.

* * * * *